Sept. 9, 1969    J. ELLENBERGER    3,466,449
THERMAL RELAY WITH A HEATED BIMETAL ELEMENT AND
A TEMPERATURE COMPENSATING BIMETAL STRIP
Filed Feb. 10, 1967    5 Sheets-Sheet 1

INVENTOR
JAKOB ELLENBERGER
BY
ATTORNEY

INVENTOR
JAKOB ELLENBERGER
BY
ATTORNEY

INVENTOR
JAKOB ELLENBERGER
ATTORNEY

Sept. 9, 1969  J. ELLENBERGER  3,466,449
THERMAL RELAY WITH A HEATED BIMETAL ELEMENT AND
A TEMPERATURE COMPENSATING BIMETAL STRIP
Filed Feb. 10, 1967  5 Sheets-Sheet 5

INVENTOR
JAKOB ELLENBERGER
BY
ATTORNEY 3,466,449
THERMAL RELAY WITH A HEATED BIMETAL
ELEMENT AND A TEMPERATURE COMPEN-
SATING BIMETAL STRIP
Jakob Ellenberger, Altdorf, near Nuremberg, Germany,
assignor to Firma Ellenberger & Poensgen G.m.b.H.
Filed Feb. 10, 1967, Ser. No. 615,182
Claims priority, application Germany, Apr. 30, 1966,
E 31,572
Int. Cl. H01j 39/12
U.S. Cl. 250—215                          11 Claims

ABSTRACT OF THE DISCLOSURE

A time-delay snap-action relay which is shock and vibration-resistant and provided with a pair of bimetal strips which are rigidly connected at one end to each other and are pivotable about said end, and wherein one bimetal strip is adapted to be heated by a heating coil and has its other end secured in a fixed position, while the other end of the other bimetal strip which serves for compensating the outside temperature is adapted to actuate the switch contacts with a snap action.

BACKGROUND OF THE INVENTION

Field of the invention

The present invention relates to a time delay relay which comprises a pair of bimetal strips which are mounted in a spaced relation parallel to each other and are rigidly connected at one end to each other and adapted to actuate switch contacts. One of these bimetal strips serves for compensating the outer temperature.

DESCRIPTION OF THE PRIOR ART

As disclosed, for example, in the German Patent No. 626,992, there is a known time delay relay of this type wherein the two bimetal strips are secured to a stationary insulating block and surrounded by heating coils. The free end of the first of the bimetal strips carries a double contact which in the inactive position of the relay is located between but spaced from the arms of the U-shaped contact which is secured to but insulated from the end of the other bimetal strip. When the outside temperature changes or when under the action of the current flowing through the two equal heating coils both bimetal strips bend simultaneously in the same direction, the double contact of the first bimetal strip remains at the center of the U-shaped contact of the other bimetal strip and does not engage therewith. This known time delay relay is therefore not affected by the surrounding temperature. The heating coils of both bimetal strips are connected in series with the filaments of lamps which may serve for illuminating a motor vehicle. If one filament breaks, the circuit of the heating coil of one bimetal strip will be interrupted so that this bimetal strip will cool off and the contacts of both bimetal strips will engage with each other. This known time delay relay has the disadvantage that it is very sensitive to shock and vibrations and therefore unreliable in operation. This is due to the fact that, when the usual shocks and vibrations occur in a motor vehicle, the double contact of the first bimetal strip will engage with the U-shaped contact of the other bimetal strip or vice versa.

SUMMARY OF THE INVENTION

It is an object of the present invention to provide a time delay relay which overcomes the disadvantages of the relay as above described by being insensitive to shock and vibrations, while being of a very compact construction so as to require little space for its installation, and it is a further object to design this relay so as to permit it to be very easily installed and to be easily and safely connected electrically.

According to the invention, these objects are attained by pivotably mounting the two bimetal strips at their ends which are rigidly connected to each other, by securing the heated bimetal strip in a fixed position at its other end, and by designing the other compensating bimetal strip so that its other end will actuate the switch contacts with a snap action.

The time delay relay according to the invention is therefore designed so that the heated bimetal strip is securely mounted at both ends and can therefore not be affected by shocks and vibrations which can also not affect the compensating bimetal strip because it is connected to snap-action contacts. These contacts will not be switched over from one fixed contact to the other until they are acted upon by a certain force which is produced by the heated bimetal strip.

The two bimetal strips may be connected to each other by means of an insulating block which is pivotably mounted on a stationary pin, and the end of the heated bimetal strip opposite to the insulating block is secured to a setscrew which may be turned for varying the position of the free end of the compensating bimetal strip relative to the switch contacts and for thus adjusting the position of this bimetal strip very accurately.

The compensating bimetal strip acts upon a slotted or framelike contact spring which carries the movable switch contact and is disposed substantially parallel to the compensating bimetal strip. The aperture or slot between the arms of this framelike contact spring receives the compensating bimetal strip when the same is being pivoted. Adjacent to this aperture, the contact spring is provided with a bent tongue which acts as a snapping member and the free end of which is pivotably connected to the free end of the compensating bimetal strip. This type of construction permits the time delay relay according to the invention to be built of extremely small dimensions. The contact spring may be secured to a metal frame which may be integral with a connecting terminal and in which the pivot pin is secured for pivotably mounting the insulating block.

In order to prevent the heated bimetal strip from being overheated while bending, this strip or the insulating block may be provided with an auxiliary contact spring which extends substantially parallel to the heated bimetal strip and has a contact which engages upon an opposite fixed contact when the heated bimetal strip is in a cold condition and disengages from this contact when the heated bimetal strip is bent. The contact of the auxiliary contact spring and its opposite fixed contact are for this purpose electrically connected in series with the heated bimetal strip or with its heating coil. When the heated bimetal strip is bent and the contact of the auxiliary contact spring separates from the opposite fixed contact, the circuit of the heated bimetal strip or its heating coil will thereby be interrupted so that any further heating of the bimetal strip which might damage the same will be prevented.

In order to permit the time delay relay according to the invention to be employed, for example, for switching street lights on and off, it may be provided with a photoconductive cell which is connected in series with the heated bimetal strip or its heating coil. When this cell is hit by light, its resistance will be low and the current flowing through it and through the bimetal strip or its heating coil will be so strong as to heat the bimetal strip so that the contacts will be opened and the lights will go out. At dusk, the resistance of the cell increases so that the current passing through the heating coil will be low. The contacts of the relay are then closed and the lights will therefore go on. In real darkness, the resistance of the cell will be so high and the current so low that the heat output will not be sufficient to bend the bimetal strip so as to actuate the relay. The contacts of the relay therefore remain closed and the light will continue to burn.

BRIEF DESCRIPTION OF THE DRAWINGS

The features and advantages of the present invention will now be described in greater detail with reference to the accompanying drawings, in which:

FIGURE 12 shows a top view of the relay as shown in FIGURE 11; while

DESCRIPTION OF PREFERRED EMBODIMENTS

Figure 1:
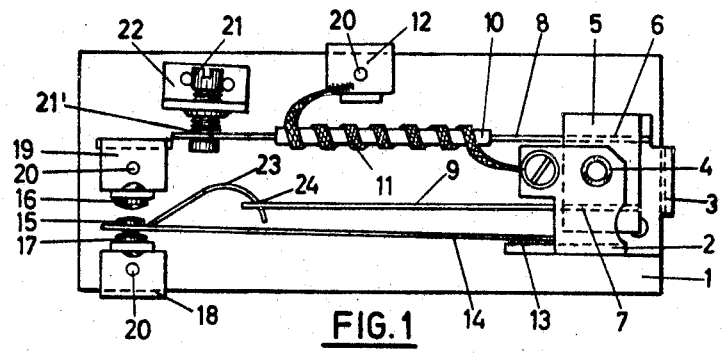
FIGURE 1 shows a side view of a time delay relay according to the invention, in which the heated bimetal strip is in its inactive position.

The time delay relay according to the invention as illustrated in all of the drawings comprises a plate 1 of insulating material on which all of the parts of the relay are mounted. A stamped U-shaped metal frame 2 is secured to the right end of the insulating plate 1 and carries integrally therewith a connecting terminal 3 in the form of a plug socket. The two arms of frame 2 carry a tubular rivet on which a block 5 of insulating material is pivotally mounted. This insulating block 5 may consist of two parts each of which is provided with a pair of corresponding recesses 6 and 7 into which the right ends of a heated bimetal strip 8 and of a compensating bimetal strip 9 are inserted. The two parts of the insulating block 5 may be rigidly connected to each other and the two bimetal strips 8 and 9 may be rigidly mounted by means of a tubular rivet, not shown, which extends through aligned bores in both parts of the insulating block 5 and is adapted to receive the tubular rivet 4.

Figure 2:
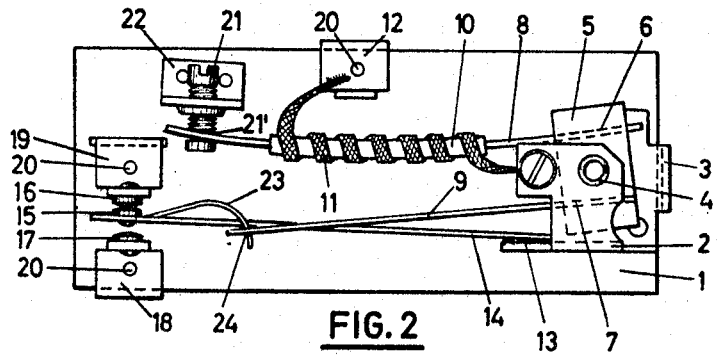
FIGURE 2 shows another side view of the same relay, but with the heated bimetal strip in its bent condition.
Figure 3:
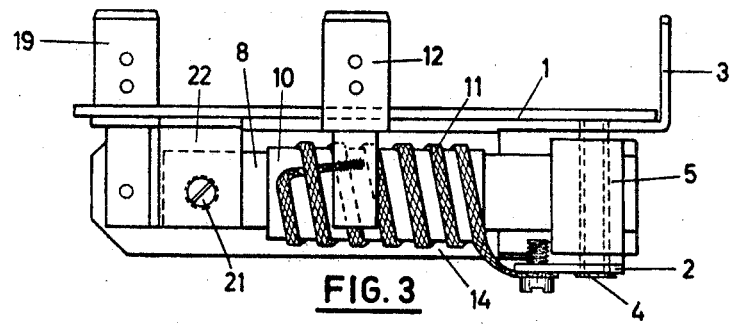
FIGURE 3 shows a top view of the relay according to FIGURE 1.

The bimetal strip 8 is partly covered by an insulating tube 10 upon which a heating coil 11 is wound, the left end of which is electrically connected according to FIGURES 1 to 3 to a connecting terminal 12, while the right end of this heating coil is electrically connected to the metal frame 2. At 13 a contact spring 14 is secured to the metal frame 2 which is of a framelike shape so as to have a longitudinal slot through which the bimetal strip 9 may pass, and its left end is provided with a contact 15 which is operatively associated with a pair of fixed contacts 16 and 17 which are mounted on connecting terminals 18 and 19 in the form of plug sockets. As illustrated particularly in FIGURE 3, all of the connecting terminals 3, 12, 18 and 19 form plugs which project vertically from the insulating plate 1 so that by a single manipulation the relay may be simply and quickly plugged into corresponding sockets of a terminal panel and may thus be electrically connected. By plugging these terminals into the associated sockets, the relay will also be very simply and securely mounted mechanically. The terminals 3, 12, 18, and 19 are made by stamping and each of them consist of a central part which is secured to the insulating plate 1 by a tubular rivet 20 and two other parts which are bent at right angles to the central part in opposite directions to each other.

The left end of the bimetal strip 8 is hooked into an annular groove 21' in a setscrew 21 which is screwed into an angle 22 which is secured to the insulating plate 1. Contact spring 14 is provided with a relatively wide longitudinal slot through which the compensating bimetal strip 9 may pass when the bimetal strip 8 bends downwardly as shown in FIGURE 2. At the left end of this slot, contact spring 14 carries integrally thereon a curved resilient tongue 23, the free end of which is pivotably connected at 24 to the free end of the compensating bimetal strip 9. The free end of the tongue 23 may for this purpose be provided with a recess or aperture into which the free end of strip 9 engages. Of course, this may also be reversed by providing the bimetal strip 9 with an aperture into which the end of the resilient tongue 23 engages.

In FIGURE 1, the bimetal strip 8 is illustrated in its straight position while cold. If the two bimetal strips 8 and 9 are heated by the surrounding temperature which is higher than 20° C., both bimetal strips 8 and 9 will be bent downwardly in the manner as shown by the bimetal strip 8 in FIGURE 2. The position of joint 24 between the bimetal strip 9 and tongue 23 then remains unchanged and the operation of the switch remains unaffected.

If the outside temperature sinks to one lower than 20° C., both bimetal strips 8 and 9 will bend in the opposite direction. The position of joint 24 then also remains unchanged.

If the bimetal strip 8 is heated by the heating coil 11, it will bend downwardly as shown in FIGURE 2. The joint 24 will then pass its tilting point and the contact spring 14 will be pivoted abruptly in the clockwise direction by the compensating bimetal spring 9 and by means of the snap member in the form of the resilient tongue 23. Contact 15 on contact spring 14 will thereby be disengaged from the fixed contact 17 and pressed against the other fixed contact 16, as shown in FIGURE 2. When the bimetal strip 8 cools off, the relay parts will return to the position as shown in FIGURE 1.

Figure 4:
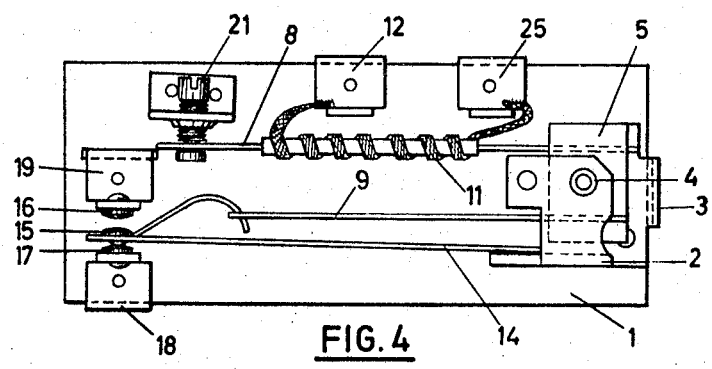
FIGURE 4 shows a side view similar to FIGURE 1, in which, however, the right end of the heating coil of the heated bimetal strip is connected to a separate connecting terminal.

The time delay relay as illustrated in FIGURE 4 differs from that according to FIGURES 1 to 3 by the fact that the right end of heating coil 11 is connected to a separate terminal 25.

Figure 5:
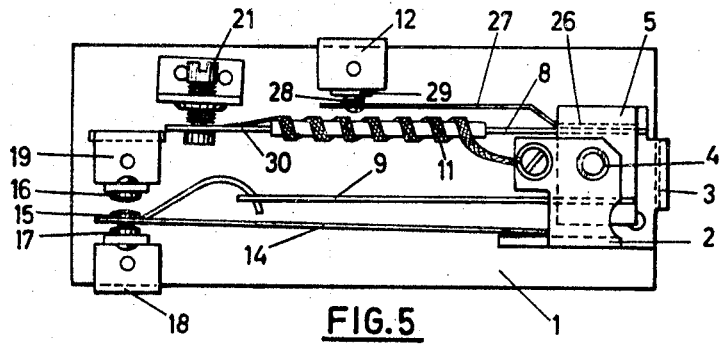
FIGURE 5 shows a side view of a time delay relay according to a modification of the invention, in which this relay is provided with an auxiliary contact spring and the heated bimetal strip is shown in its inactive condition.
Figure 6:
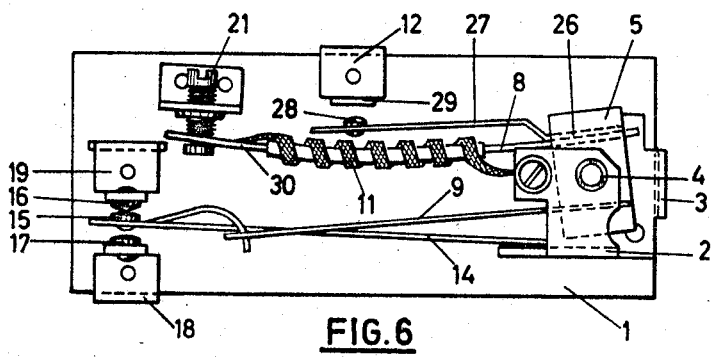
FIGURE 6 shows another side view of the relay according to FIGURE 5, but with the heated bimetal strip in its bent condition.
Figure 7:
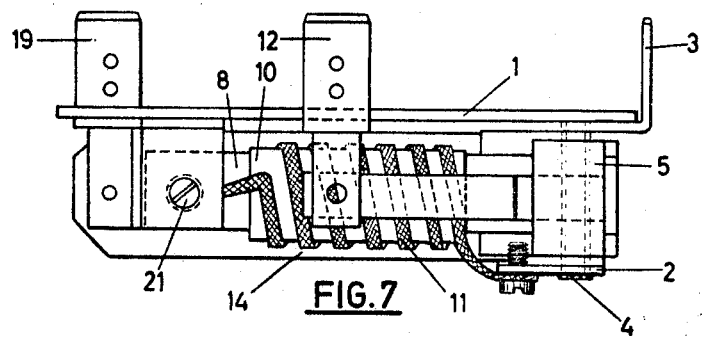
FIGURE 7 shows a top view of the relay according to FIGURE 5.

FIGURES 5 to 7 illustrate a further time delay relay according to the invention which is equipped with an additional auxiliary contact spring 27 which is mechanically and electrically connected at 26 to a bimetal strip 8 and has a contact 28 which normally engages upon a fixed contact 29 which may be secured to the connecting terminal 12. These two contacts 28 and 29 lie in series with the bimetal strip 8 and the heating coil 11, the left end of which is secured at 30 to the bimetal strip 8. When the bimetal strip 8 bends downwardly to a certain extent, as shown in FIGURE 6, contact 28 on contact spring 27 will disengage from the fixed contact 29 and thereby interrupt the circuit of heating coil 11. Bimetal strip 8 is thus protected from being overheated.

Figure 8:
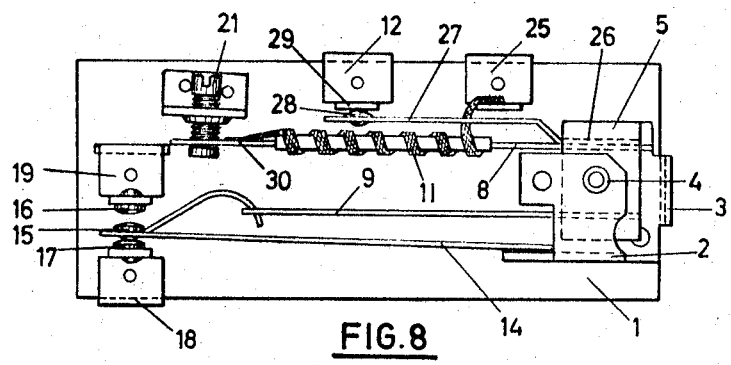
FIGURE 8 shows a similar side view as FIGURE 5, in which, however, the right end of the heating coil of the heated bimetal strip is connected to a separate connecting terminal.

In the time delay relay according to FIGURE 8, the right end of heating coil 11 is connected to the separate connecting terminal 25.

FIGURES 9 to 12 illustrate the time-delay relay according to the invention as being additionally provided with a photoconductive cell 31 the terminals 32 and 33 of which are connected electrically and mechanically to connecting terminals 12 and 34, respectively.

Figure 13:
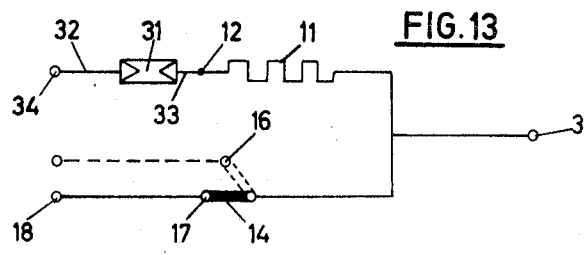
FIGURE 13 shows a circuit diagram of the relay according to FIGURES 9 to 12.

As illustrated particularly in FIGURE 13, the photoconductive cell 31 is connected in series with heating coil 11 of the bimetal strip 8. The terminals 34 and 3 are connected to the power supply line, while the terminals 18 and 34 may be connected to current-consuming devices, for example, lamps.

Figure 9:
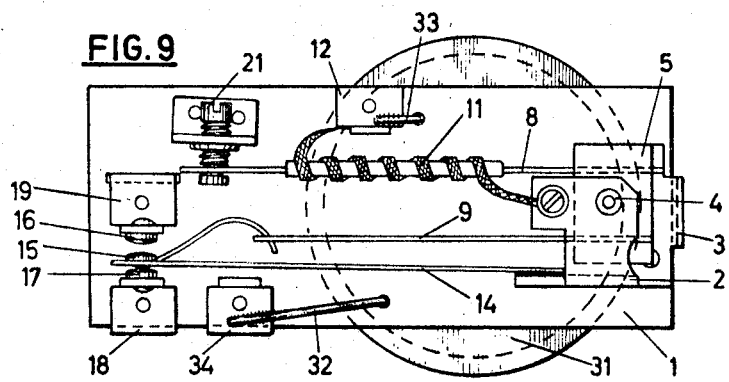
FIGURE 9 shows a side of the same time delay relay as shown in FIGURE 1, but connected to a photoconductive cell.
Figure 10:
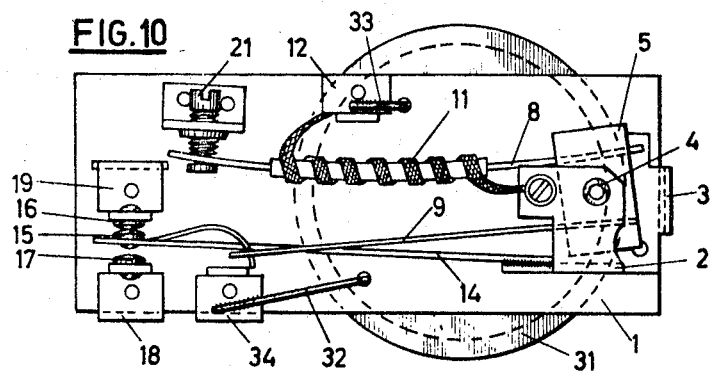
FIGURE 10 shows another side view of the relay according to FIGURE 9, but with the heated bimetal strip in its bent condition.
Figure 11:
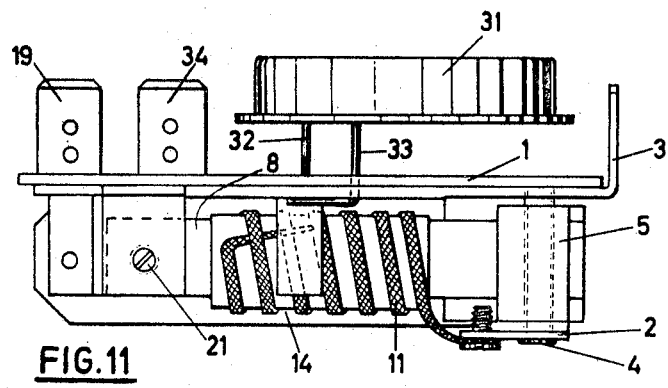
FIGURE 11 shows a top view of the relay according to FIGURE 9.
Figure 12:
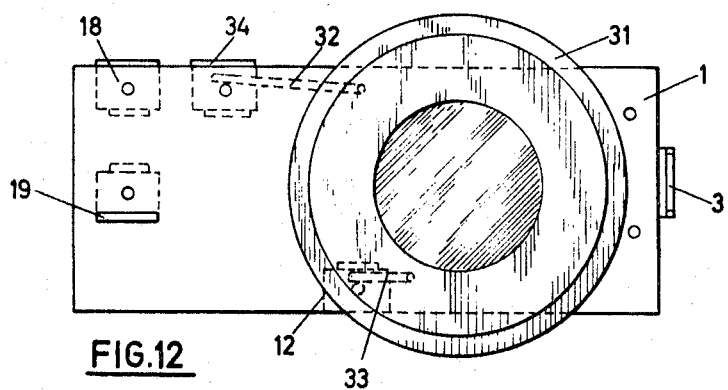

In the dark, no light will fall upon the photoconductive cell 31. Its resistance is then relatively high and the current flowing through the heating coil 11 is very low so that the bimetal strip 8 will not be bent. The relay contacts 15 and 17 are then closed so that the lamps which are connected to the terminals 18 and 34 will burn. As soon as light falls at dawn upon the photoconductive cell 31, the resistance of the latter will decrease so that sufficient current will flow through heating coil 11 to heat the bimetal strip 8 which will thereby be bent so that the relay contacts 15 and 17 will be separated and the lamps will thus be switched off. At dusk, the resistance of the photoconductive cell 31 will increase so that the current flowing through heating coil 11 will decrease. The bimetal strip 11 will then cool off and be bent back to its straight position as shown in FIGURE 9. The relay contacts 15 and 17 are then closed and will again switch on the lamps which are connected to the terminals 18 and 34.

Of course, it is also possible to provide the compensating bimetal strip 9 with a heating coil so that each bimetal strip 8 and 9 will carry a heating coil. By current impulses it is then possible to energize either one or the other heating coil and to heat and bend the associated bimetal strip. One bimetal strip will then serve for switching on the time delay relay, while the other bimetal strip will serve for switching it off.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. An instantaneous circuit break and circuit making relay operating independently of outside temperature and vibrations and shocks,
an instantaneous, shock- and vibration-resistant circuit making and breaking relay comprising:
a base;
a first heated bi-metal strip;
a second compensating bi-metal strip;
means to heat said first bi-metal strip independently of the outer temperature of the base;
said first bimetal strip and said second bimetal strip mounted parallel to each other in absence of heating of said first bimetal strip;
a bracket mounted to said base;
means for securing the free ends of each said first and second bimetal strips fixedly mounted spaced from each other in said bracket;
said bracket mounted pivotably in response to the heating means of said first bimetal strip;
means to mount said first bimetal means and said second bimetal means to bend in the same direction in response to the outside temperature to compensate therefor;
a pair of electric contacts fixedly connected to said base spaced from each other;
an elongated contact spring mounted with one end fixedly to the base and with its free end in between said two electric contacts;
means to mount said first and second bimetal strips, said bracket, said spring contact and said two contacts relative to each other including snap acting means connected between the free end of said second bimetal strip and said spring to throw said spring contact into contact with one of said two contacts when said first bimetal strip is heated and to keep it in contact with the opposite said contact in absence of heating said first bimetal spring.

2. An instantaneous circuit break and circuit making relay as claimed in claim 1, said means to mount comprising a resilient tongue means mounted about parallel to and linking the free end of said second bimetal strip with the free end of said contact spring means for abruptly switching over said contact spring from one said contact to the other when said first contact spring is bent.

3. An instantaneous circuit break and circuit making relay as claimed in claim 1, further comprising a power supply line and one electric terminal electrically connecting said power supply line with the heating means of said first bimetal strip.

4. A time-delay relay as defined in claim 1, wherein said connecting means of said bimetal strips comprise a block of insulating material on which one end of each of said strips is secured.

5. A time-delay relay as defined in claim 1, wherein said means for securing the other end of said first bimetal strip comprise a setscrew for adjusting the position of said end.

6. A time delay relay as defined in claim 1, wherein said contact spring extends substantially parallel to said second bimetal strip when said relay is not actuated and has an aperture through which said second bimetal strip is adapted to pass when pivoting, and further comprising a curved resilient tongue serving as a snap-action member secured at one end to said contact spring adjacent to one end of said aperture and near said free end of said contact spring and pivotably connected near its other end to a point of said second bimetal strip near the free end thereof.

7. A time delay relay as defined in claim 6, wherein said connecting means of said bimetal strips comprise a block of insulating material and further comprising a metal frame having a connecting terminal integral thereon, said insulating block being disposed within said metal frame, said means for pivotably mounting said connecting means comprising a pivot pin secured to said base and extending through said frame and said insulating block.

8. A time delay relay as defined in claim 1, further comprising an additional fixed contact, and an auxiliary contact spring secured at one end to said connecting means and pivotable with said bimetal strips and having a contact on its free other end adapted to engage upon said additional fixed contact when said first bimetal strip is in a cold condition and to disengage therefrom when said first bimetal strip is heated and bent, said auxiliary contact spring and said additional fixed contact being connected in series with said first bimetal strip.

9. A time delay relay as defined in claim 1, further comprising a photoconductive cell connected in series with said heating means of said first bimetal strip.

10. A time delay relay as defined in claim 9, wherein said base comprises a plate of insulating material, said photoconductive cell also being mounted on said base.

11. A time delay relay as defined in claim 10, wherein said photoconductive cell is mounted on a first side of said insulating plate and all of said other elements of said relay are mounted on the other side of said plate, and a plurality of connecting terminals for said relay in the form of plug contacts secured to and projecting at right angles from said first side of said plate.

References Cited

UNITED STATES PATENTS 1,777,963  10/1930  Doman _____ 200—122
3,056,035  9/1962   Bernheim _____ 250—239

OTHER REFERENCES

German printed application 1,101,644 (1961).

BERNARD A. GILHEANY, Primary Examiner

R. L. COHRS, Assistant Examiner

U.S. Cl. X.R.

337—103, 112